United States Patent [19]

Jo

[11] Patent Number: 5,767,920
[45] Date of Patent: Jun. 16, 1998

[54] COLORING DEVICE AND METHOD FOR SPECIFIC REGION ON A VIDEO DISPLAY SCREEN

[75] Inventor: Seong-Won Jo, Seoul, Rep. of Korea

[73] Assignee: Samsung Electronics Co., Ltd., Kyungki-Do, Rep. of Korea

[21] Appl. No.: 757,829

[22] Filed: Nov. 27, 1996

[30]     Foreign Application Priority Data

Nov. 28, 1995  [KR]  Rep. of Korea ............... 1995/44244

[51] Int. Cl.$^6$ ............................................. H04N 5/14
[52] U.S. Cl. ..................................... 348/577; 348/576
[58] Field of Search .............................. 348/577, 578, 348/705, 708, 579, 576; H04N 5/14

Primary Examiner—Sherrie Hsia
Attorney, Agent, or Firm—Sughrue, Mion, Zinn, Macpeak & Seas, PLLC

[57]     ABSTRACT

A device and method for performing a coloring set operation for a specific region on a screen of a video signal process device which designates the specific region on a liquid crystal monitor and displays the specific region with a specific color onto the screen. The method includes determining whether the specific region is designated by a user in response to an input corresponding to a coloring mode and a specific region select mode; setting a luminance signal level of the specific region, if the specific region is designated and maintaining a color phase in a default state; if a color up/down input is entered, performing an up/down operation for the color phase by a predetermined angle to set the color phase; and completing the coloring set operation in response to an input corresponding to a coloring completion mode.

15 Claims, 6 Drawing Sheets

COLORING DEVICE AND METHOD FOR SPECIFIC REGION ON A VIDEO DISPLAY SCREEN

BACKGROUND OF THE INVENTION

1. Field of the Invention

The present invention relates to video signal process equipment which has an operator interface, such as a screen display device, and more particularly to a device and method for performing a coloring set operation for a specific region on a screen of video signal process equipment, by which the specific region on a screen is designated and the specific region is displayed with a specific color on the screen. The present application is based on Korean Patent Application No. 44244/1995 which is incorporated herein by reference for all purposes.

2. Description of the Related Art

In devices such as camcorders for photographing a subject, the photographed subject is generally displayed with a color or white/black on the screen background. The whole screen is filled with the white/black or any color. If users could directly emphasize only a specific region displayed on the screen in the camcorder with a desired specific color, various screen editing operations and performance could be accomplished.

SUMMARY OF THE INVENTION

Therefore, it is an object of the present invention to provide a device and method for performing a coloring set operation for a specific region on a screen with a desired specific color by a user.

It is another object of the present invention to provide a device and method for designating a specific region on a liquid crystal monitor capable of being interfaced with a user and for coloring and displaying the specific region with a specific color.

It is yet another object of the present invention to provide a device and method for performing an addition coloring process operation for the whole screen of a video device.

According to an aspect of the present invention, there is provided a device for performing a coloring set operation for a specific region on a screen in video signal process equipment, including a color phase input unit for applying a corresponding color phase when a specific color on the specific region on the screen is selected by a user; a screen display and specific region input unit for performing a screen display and for applying a corresponding luminance signal level when the specific region on the screen is designated by the user; a luminance signal process unit for processing a video signal and outputting the video signal as a luminance signal; a chrominance signal process unit for processing the video signal and outputting the video signal as the chrominance signal; a control unit for setting the applied color phase and the luminance signal level and detecting the luminance signal level from the luminance signal of the luminance signal process unit, and when the set luminance signal level and the detected luminance signal level are the same, for performing a coloring control for the specific region on the screen; a coloring process unit for processing the video signal with a corresponding color to the set color phase under the coloring control of the control unit to output a coloring signal; a select unit for selecting the coloring signal during the coloring control of the control unit is executed, and selecting the chrominance signal, if the coloring control of the control unit is not executed; and a mixing unit for mixing an output signal of the select unit with the luminance signal and outputting a mixed result.

According to another aspect of the present invention, there is provided a method of performing a coloring set operation for a specific region on a screen in video signal process equipment having a liquid crystal monitor, or the like, executing screen display and data input operations, including determining whether the specific region of the monitor is designated by a user in response to a key input corresponding to a coloring mode and a specific region select mode; setting a luminance signal level of the specific region if the specific region is designated and maintaining a color phase in a default state; if a color up/down key is entered, performing an up/down operation for the color phase by a predetermined angle to set the color phase; and completing the coloring set operation in response to a key input corresponding to a coloring completion mode.

The foregoing and other objects, features and advantages of the invention will become more readily apparent from the following detailed description of a preferred embodiment of the invention which proceeds with reference to the accompanying drawings.

DETAILED DESCRIPTION OF THE PREFERRED EMBODIMENT

Figure 1:
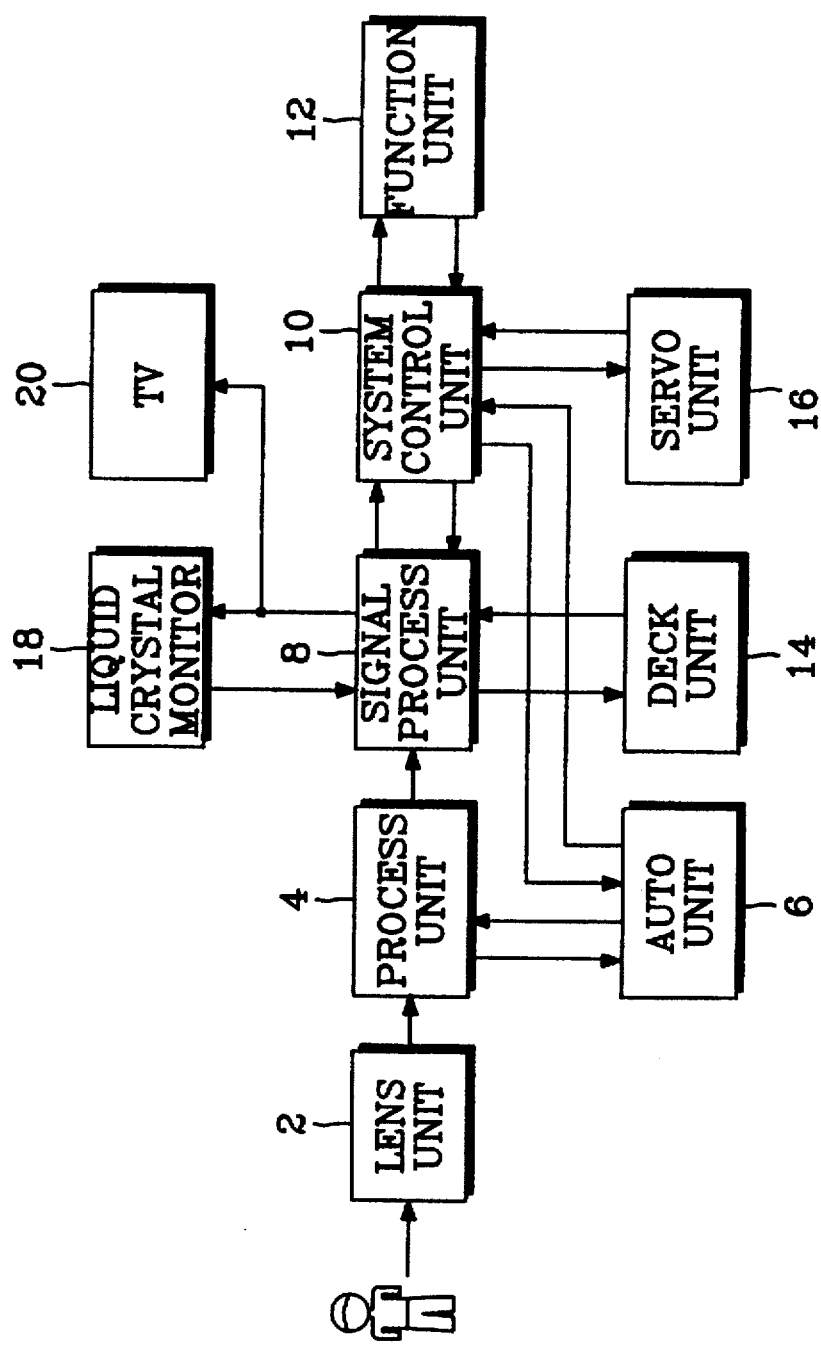
FIG. 1 is a block diagram illustrating a construction of a camcorder according to a preferred embodiment of the present invention.

FIG. 1 is a block diagram of a camcorder which includes a camera system and a video cassette recorder (VCR) system. The camera system includes a lens unit 2, a process unit 4 and an auto unit 6, and the VCR system includes a signal process unit 8, a system control unit 10, a function unit 12, a deck unit 14 and a servo unit 18.

The lens unit 2 includes a lens system having a magnification and focus lens system, a zoom motor, a focus motor and an iris motor. The process unit 4 processes an image through the lens 2 with a charge coupled device (CCD) and separates it into luminance and chrominance (Y/C) signals. The auto unit 6 performs a serial interface with the system control unit 10 and controls the lens 2 and the process unit 4. The signal process unit 8 processes the Y/C signals and outputs these signals to an external device (a liquid crystal monitor 18 or a television set TV 20), or records the information on a tape within the deck unit 14. The system control unit 10 includes a microprocessor and implements the overall control operation of the camcorder. The function unit 12 includes a plurality of keys, i.e. a keypad, and generates key data corresponding to a user's command which is inputted by pressing a desired key. The key data is input to the system control unit 10. The key data generated by the function unit 12 are as follows: a coloring mode key, a specific region select mode key, a select set key, a select clear key, a color up/down key, a coloring set key, a coloring mode key, and the like. The servo unit 16 controls a drum motor, a capstan motor and a loading motor under the control of the system control unit 10. The liquid crystal monitor 18 may be used as a liquid crystal display and may be used as an input device. The liquid crystal monitor 18 displays the Y/C signals output from the signal process unit 8 and applies luminance data for the specific region on the screen selected by the user to the system control unit 10 through the signal process unit 8. The TV 20 receives the Y/C signals from the signal process unit 8 and an audio signal.

Figure 2:
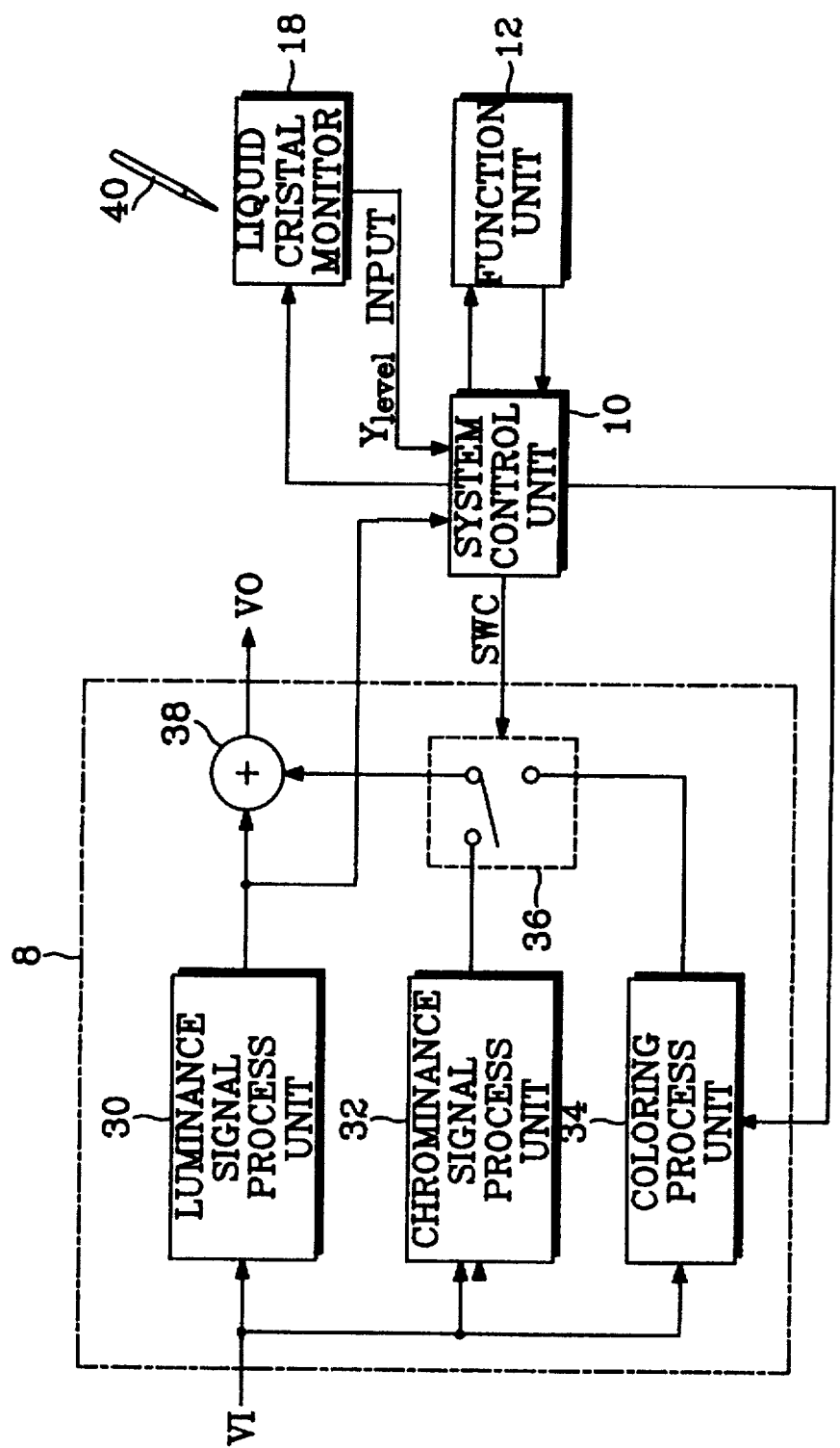
FIG. 2 is a block diagram illustrating a device for coloring a specific region on a screen according to the preferred embodiment.

FIG. 2 is a block diagram illustrating a device for coloring a specific region on a screen according to the preferred embodiment of the present invention. The signal process unit 8 is comprised of a luminance signal process unit 30, a chrominance signal process unit 32, a coloring process unit 34, a switching unit 36 and a mixer 38. The luminance signal process unit 30 processes a video signal VI and outputs a luminance signal to the mixer 38. The chrominance signal process unit 32 processes the video signal VI and outputs a chrominance signal to the switching unit 36. The coloring process unit 34 processes the specific region on the screen with a specific color and outputs a coloring signal. The switching unit 36 has one input terminal connected to the output of chrominance signal process unit 32 and the other input terminal connected to the coloring process unit 34. The switching unit 36 selects the chrominance signal output from the chrominance signal process unit 32 or the coloring signal output from the coloring process unit 34 in response to a switching control signal SWC generated by the system control unit 10 and outputs the selected signal to the mixer 38. The mixer 38 mixes the luminance signal output from the luminance signal process unit 30 and the selected signal from the switching unit 36 and outputs the mixed signal. The video signal output from the mixer 38 is designated as a video signal VO in FIG. 2.

The luminance signal output from the luminance signal process unit 30 is inputted into the system control unit 10 as well as the mixer 38. The system control unit 10 is interfaced with the liquid crystal monitor 18 and the function unit 12 and controls the coloring process unit 34 and the switching unit 36. The system control unit 10 interfaces the liquid crystal monitor 18 and the function unit 12 with the user. The image photographed by the camcorder is displayed on the liquid crystal monitor 18 and the user can designate a specific region on the screen currently displayed with an electronic pen 40 or his own hand using a common "touch screen" or the like. When the user designates the specific region on the screen, the liquid crystal monitor 18 outputs luminance signal level $Y_{level}$ corresponding to the designated specific region to the system control unit 10.

An explanation of the coloring process unit 34 of FIG. 2 is described below with reference to FIGS. 3 to 5.

Figure 3:
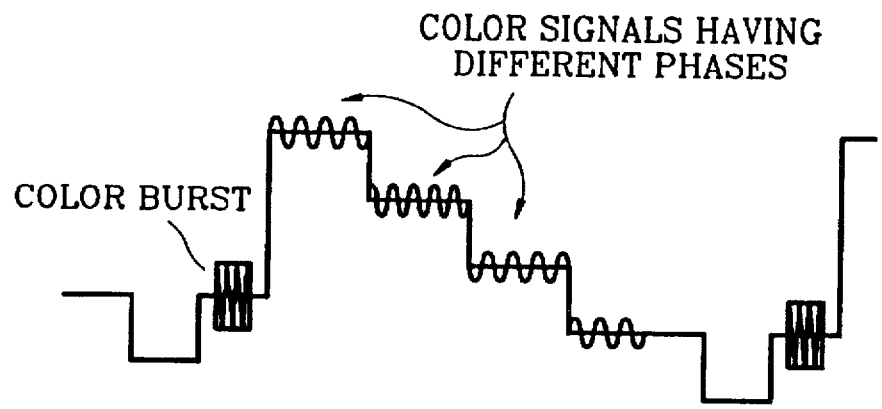
FIG. 3 is a waveform diagram for a general color bar signal.
Figure 4:
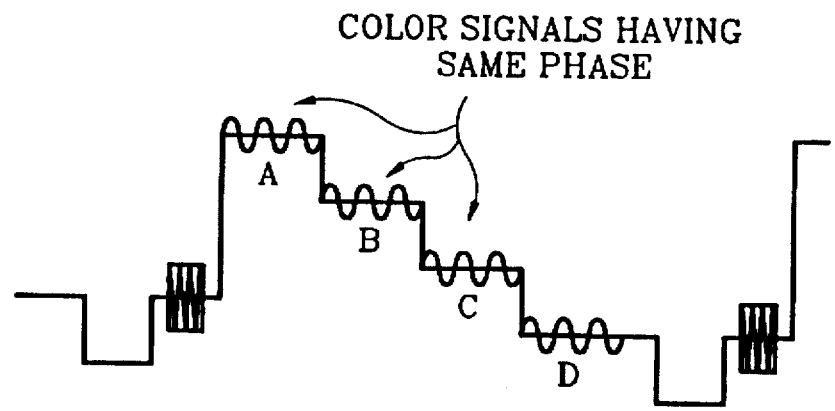
FIG. 4 is a waveform diagram for the color bar signal which are coloring-processed.
Figure 5:
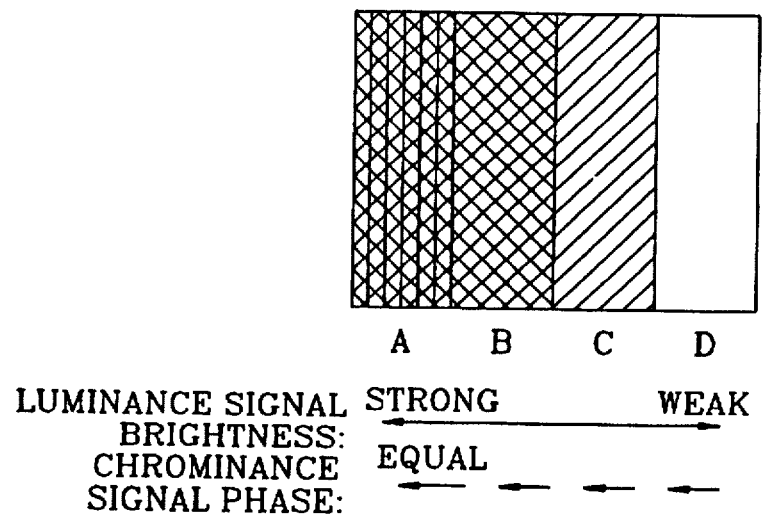
FIG. 5 is a view illustrating a screen on which the coloring-processed color bar signal is displayed.

FIG. 3 is a waveform diagram for a general color bar signal, FIG. 4 is a waveform diagram for the color bar signal that is coloring-processed, and FIG. 5 is a view illustrating a screen on which the color bar signal that is coloring-processed is displayed. In the general color bar signal of FIG. 3, there are a plurality of luminance signal levels between color bursts, on which there exist color signals having different phases from each other. This color bar signal constitutes a natural color screen that represents the image.

The color bar signal shown in FIG. 4 is made by performing a coloring process for the whole screen in the coloring process unit 34. The color signals having the same phase as each other exist in each of respective luminance signal levels. The color bar signal of FIG. 4 yields the screen shown in FIG. 5. Referring to FIG. 5, the whole screen is a single color and the brightness of screen is varied in accordance with the luminance signal brightness. The coloring process unit 34 coloring-processes only the specific region under the control of the system control unit 10, so that the specific region may have a specific chrominance signal phase. Thus, the specific region can be marked and colored as desired.

To perform a coloring process in the present invention, a coloring set operation must be first executed. The image photographed by the camcorder is displayed on the liquid crystal monitor 18. At this time, the user enters a coloring mode key provided in the function unit 12 for performing the coloring process for the specific region on the screen and also enters a specific region select mode key. Then, the user designates the desired specific region displayed on the liquid crystal monitor 18 using the electronic pen 40 or his own hand. The specific region may correspond to, for example, an edge or a lip line of the human body and so on. The function unit 12 outputs the corresponding key data to the system control unit 10 in response to the coloring mode key and the specific region select mode key. The liquid crystal monitor 18 outputs the luminance signal level $Y_{level}$ of the specific region designated by the electronic pen 40 or his hand to the system control unit 10.

Figure 8:
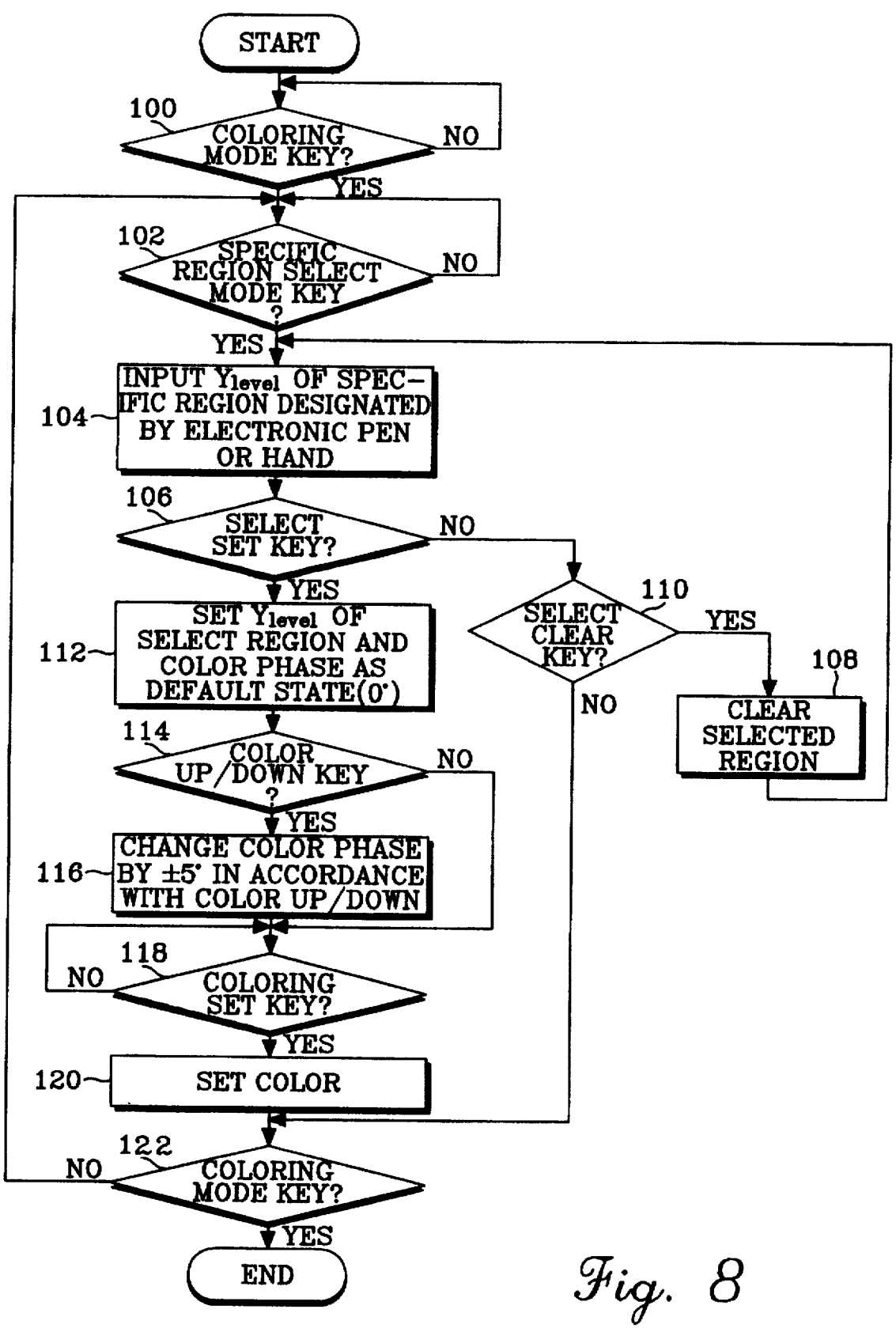
FIG. 8 is a flowchart illustrating a control procedure of a coloring set operation for the specific region according to the preferred embodiment.

The system control unit 10 performs the control procedure illustrated by the flowchart of FIG. 8 for executing the coloring set operation in accordance with the present invention. First, the system control unit 10 checks whether a coloring mode key is pressed in step 100, and checks whether a specific region select mode key is pressed in step 102. After these keys are checked, the system control unit 10 proceeds to step 104. In the step 104, the luminance signal level $Y_{level}$ for the specific region designated by the user is received.

The system control unit 10 proceeds to step 106 to check or not whether a select set key has been pressed. If not, the system control unit 10 advances to step 110 to detect whether a select clear key has been pressed. If so, the system control unit proceeds to step 108 and clears the selected region. Next, the system control unit 10 returns to the step 104. In the meantime, if the select clear key has not been entered in the step 110, the system control unit 10 goes to step 122 and detects whether a coloring mode key has been pressed.

If, however, the select set key in the step 106 has been input, the system control unit 10 sets the luminance signal level $Y_{level}$ applied from the liquid crystal monitor 18 and also sets the color phase to a default state in step 112. The default state of the color phase is 0°.

After step 112, the system control unit 10 proceeds to step 114 and determines whether a color up/down key is entered. If not, the system control unit 10 directly goes to step 118 to determine whether a coloring set key is present. If present, the system control unit 10 proceeds to step 120 and sets the color of the color phase default value (0°). If, however, the color up/down key has been entered in step 114, the color phase is varied by ±5° in accordance with a color up/down operation.

Figure 7:
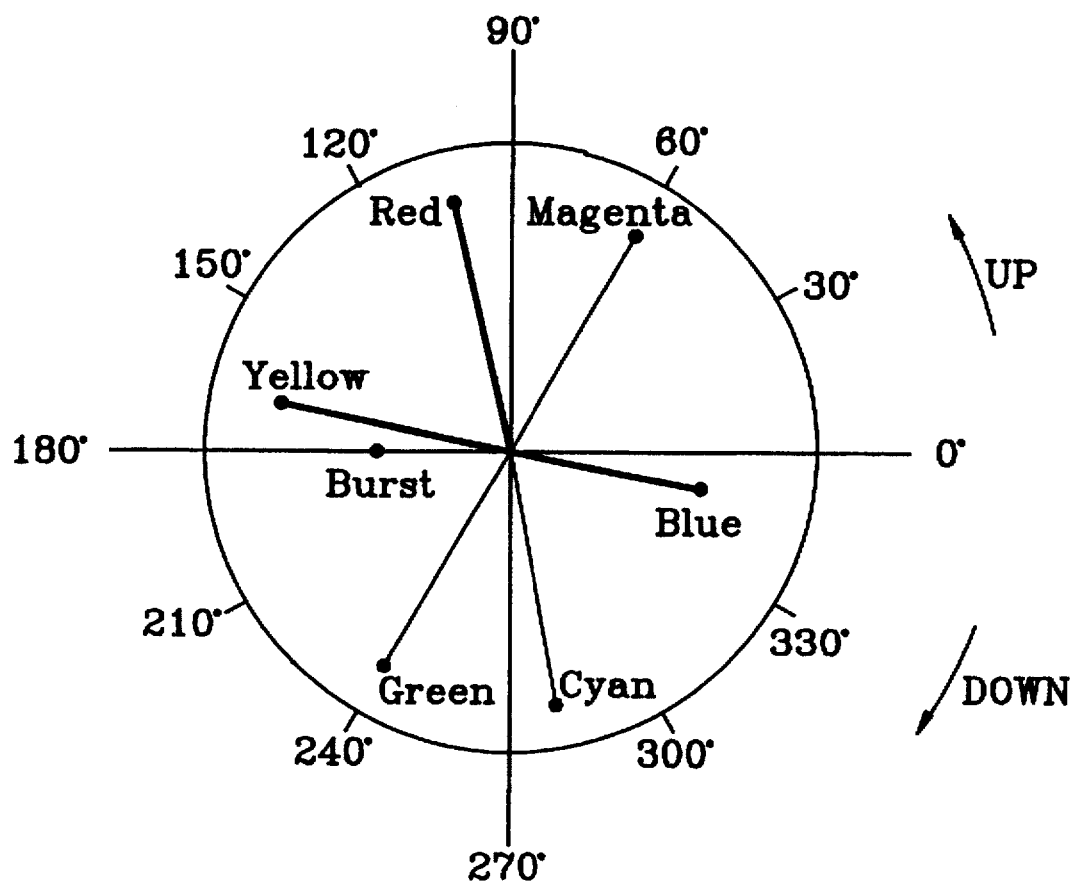
FIG. 7 is a view illustrating color phases.

FIG. 7 illustrates color phases. The color phase up/down operation will be explained in detail below. If the color up key is input, the system control unit 10 raises the color phase by ±5°. To the contrary, if the color down key is input, the system control unit 10 falls the color phase by −5°. By the manipulation of the color up/down key, the color phase can be changed within the range of 0° to 360°. At this time, the color according to the changed color phase is displayed on the liquid crystal monitor 18. Therefore, the user can select desired colors for the specific region through the color phase up/down operation.

If the user sees the color displayed on the liquid crystal monitor 18 and enters the coloring set key through the function key 12, the system control unit 10 detects the color in step 118 and proceeds to step 120 to set the color of the current state. Next, the system control unit 10 proceeds to step 122 and detects whether the coloring mode key has been re-input. If so, the coloring mode is completed and therefore the control procedure is terminated. If, however, the coloring mode key is not pressed again, the system control unit 10 returns to step 102 and performs the coloring set operation for another specific region on the screen.

Returning to step 102, the system control unit 10 selects a plurality of specific regions on the screen, on which the user can perform the coloring operation with desired various colors. For example, if a first specific region may be set as the lip line, a second specific region may be set as the subject's hair.

Figure 6A:
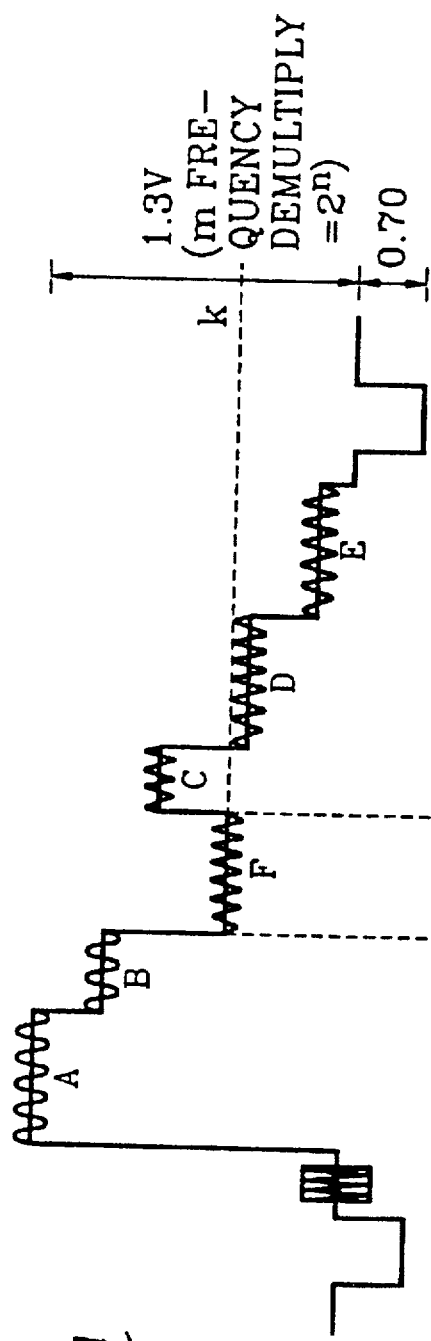
FIG. 6 is a view illustrating a screen construction of the specific region coloring process and signal lines.
Figure 6B:
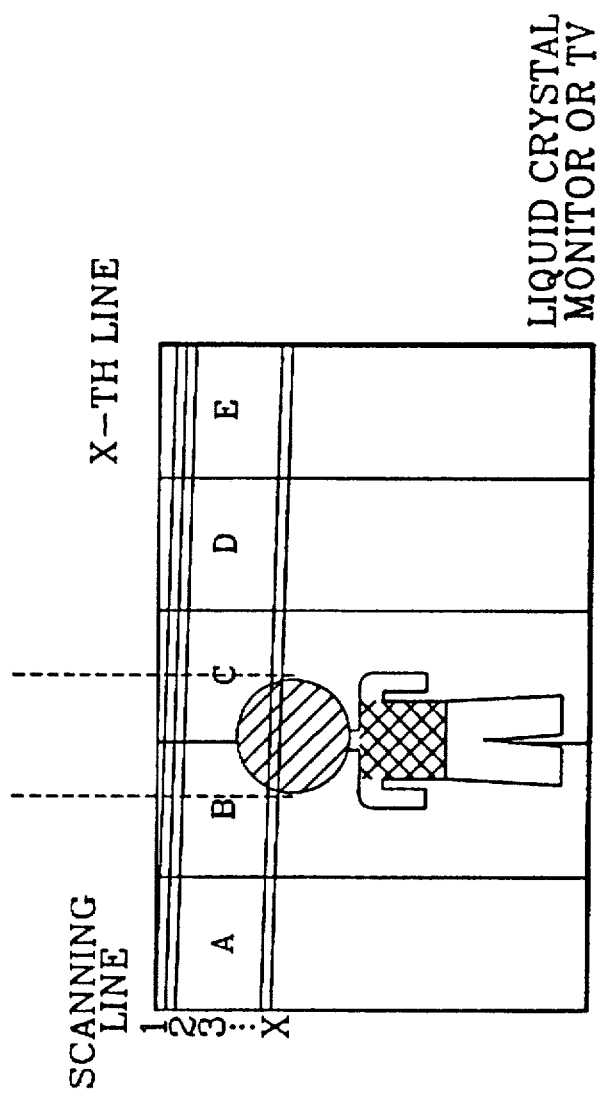

A coloring process operation is executed after the coloring set operation is completed as shown in FIG. 8. When the specific region coloring process is executed, the screen construction of the liquid crystal monitor 18 or the TV 20 and the signal line state of input video signal VI are shown in FIG. 6. It is assumed in the coloring process operation that the specific region on the screen designated by the user is the subject's hair, the luminance signal level $Y_{level}$ thereof is a "k" level, and the designated color is blue.

Returning back to FIG. 2, the video signal VI is applied in a scanning line unit to the luminance signal process unit 30, the chrominance signal process unit 32 and the coloring process unit 34, respectively. The luminance signal process unit 30 outputs the video signal VI as the luminance signal, and the chrominance signal process unit 32 outputs the video signal VI as the chrominance signal. The system control unit 10, in an initial step, controls the switching unit 36 to select the chrominance signal output from the chrominance signal process unit 32. As a result, the mixer 38 mixes the luminance signal output from the luminance signal process unit 30 and the chrominance signal output from the chrominance signal process unit 32 and outputs the mixed signal.

The luminance signal output from the luminance signal process unit 30 is applied to the system control unit 10. At this time, the luminance signal is applied in the scanning line unit. The system control unit 10 detects the luminance signal level $Y_{level}$ applied in the scanning line unit. The system control unit 10 determines whether the detected luminance signal level $Y_{level}$ is the "k" level in the coloring set operation. If the luminance signal level $Y_{level}$ reaches the "k" level in an "F" region of an X-th line, the system control unit 10 controls the switching unit 36 and the coloring process unit 34. In other words, the system control unit 10 applies the color phase value corresponding to the blue color set in the coloring set operation to the coloring process unit 34. The switching unit 36 is controlled by the system control unit 10 and selects the output of the coloring process unit 34.

The coloring process unit 34 replaces the color phase value of the "F" region of the X-th line by the color phase value applied from the system control unit 10 and outputs the coloring signal corresponding to the color phase value. Then, the mixer 38 mixes the coloring signal output from the coloring process unit 34 and the luminance signal output from the luminance signal process unit 30 and outputs the resulting mixed signal. The video signal VO output from the mixer 38 will become the coloring-processed signal of the specific region.

Sequentially, the system control unit 10 detects in the scanning line unit the luminance signal level $Y_{level}$ output from the luminance signal process unit 30 and determines whether the luminance signal level $Y_{level}$ is the "k" level in the coloring set operation. If the level $Y_{level}$ is the "k" level, the switching unit 36 selects the coloring signal output from the coloring process unit 34. If the level $Y_{level}$ is not, the "k" level, the switching unit 36 selects the chrominance signal output from the chrominance signal process unit 32. Accordingly, the liquid crystal monitor 18 or the TV 20 displaying the video signal VO output from the mixer 38 displays the specific selected region on the screen with the specific color selected by the operator.

In the above operation, it is determined whether the level $Y_{level}$ is the "k" level, but if the luminance signal level in the coloring set operation is set in a various manner, the system control unit 10 detects the luminance signal level corresponding to the luminance signal. A plurality of specific regions on the screen displayed in the liquid crystal monitor 18 or the TV 20 can be coloring-processed with prescribed various specific colors.

In the above-discussed embodiment, the region, for example, a background region, except for the specific region is processed with an original color, but it may be processed with a black/white color or a single color, if necessary. The process can be achieved by controlling the coloring process unit 34 which can make the background have the same phase.

As discussed in the above, the present invention has an advantage in that since a coloring process for a specific region on a natural color or black and white screen is executed with a desired specific color designated by a user, screen editing can be performed easily.

The disclosed embodiment of the invention can be modified in arrangement and detail without departing from the spirit and scope of the following claims.

What is claimed is:

1. An apparatus for performing a coloring set operation for a specific region on a screen in a video signal processing device, said apparatus comprising:

a color phase input unit for applying a corresponding color phase when a specific color on said specific region on said screen is selected by a user;

a screen display and specific region input unit for performing a screen display and for applying a corresponding luminance signal level when the specific region on the screen is designated by the user;

a luminance signal process unit for processing a video signal and outputting said video signal as a luminance signal;

a chrominance signal process unit for processing the video signal and outputting said video signal as a chrominance signal;

a control unit for setting an applied color phase and a luminance signal level and detecting the luminance signal level from the luminance signal of the luminance signal process unit, and when the set luminance signal level and the detected luminance signal level are the same, for performing a coloring control for the specific region on the screen;

a coloring process unit for processing the video signal with a corresponding color to the set color phase under the coloring control of said control unit to output a coloring signal;

a select unit for selecting the coloring signal when the coloring control of said control unit is executed, and selecting said chrominance signal if the coloring control of said control unit is not being executed; and a mixing unit for mixing an output signal of the select unit with the luminance signal and outputting a resulting mixed signal to the screen.

2. A method for performing a coloring set operation for a specific region on a screen in a video signal process device, said screen executing screen display and data input operations, said method comprising the steps of:

determining whether said specific region on said screen is designated by a user in response to an input corresponding to a coloring mode and a specific region select mode;

setting a luminance signal level of said specific region if said specific region is designated and maintaining a color phase in a default state;

if a color up/down input is entered, performing an up/down operation for said color phase by a predetermined angle to set said color phase; and completing the coloring set operation in response to an input corresponding to a coloring completion mode.

3. A method as claimed in claim 2, wherein color up/down and color completion inputs are accomplished by pressing keys of a keypad device.

4. A method as claimed in claim 3, wherein said screen is a liquid crystal monitor.

5. A method as claimed in claim 4, further comprising the step of canceling said specific region in response to selection of a key by the user.

6. A method for performing a coloring set operation for a specific region on a screen in a video signal process device, said screen executing screen display and data input operations, said method comprising the steps of:

determining whether said specific region is designated by a user in response to an input corresponding to a coloring mode and a specific region select mode;

setting a luminance signal level of said specific region if said specific region is designated and maintaining a color phase in a default state;

if a color up/down input is entered, performing an up/down operation for said color phase by a predetermined angle to set said color phase;

if an input corresponding to a specific region select mode is entered by the user, performing the coloring set operation for a plurality of specific regions by sequentially repeating the above steps; and completing the coloring set operation for the plurality of specific regions in response to an input corresponding to a coloring completion mode.

7. A method as claimed in claim 6, wherein color up/down and color completion inputs are accomplished by pressing keys of a keypad device.

8. A method as claimed in claim 7, wherein said screen is a liquid crystal monitor.

9. A method as claimed in claim 8, wherein the designation of said specific region on said liquid crystal monitor is executed by means of an electronic pen.

10. The method as claimed in claim 8, wherein the designation of said specific region on said liquid crystal monitor is executed by the user's hand.

11. A method for performing a coloring process operation for a specific region on a screen in a video signal process device, said screen executing display and data input operations, said method comprising the steps of:

determining whether said specific region is designated by a user in response to an input corresponding to a coloring mode and a specific region select mode;

setting a luminance signal level of said specific region if said specific region is designated and maintaining a color phase in a default state;

if a color up/down input is entered, performing an up/down operation for said color phase by a predetermined angle to set said color phase; and after the luminance signal level of the video signal is detected, comparing the detected signal level with the set luminance signal level to search the designated specific region and performing the coloring process operation for the searched specific region with a prescribed color corresponding to the color phase.

12. A method as claimed in claim 11, wherein the color up/down input is accomplished by pressing keys of a keypad device.

13. A method as claimed in claim 12, wherein said screen is a liquid crystal monitor.

14. A method as claimed in claim 13, further comprising the step of performing the coloring process operation for a portion of the screen other than the specific region with an original color of the video signal.

15. A method as claimed in claim 13, further comprising the step of performing the coloring process operation for a portion of the screen other than the specific region with a single color of the video signal.

* * * * *